(12) United States Patent
Tsukamoto et al.

(10) Patent No.: US 8,590,683 B2
(45) Date of Patent: Nov. 26, 2013

(54) DRIVE PLATE AND RING GEAR MEMBER OF DRIVE PLATE

(75) Inventors: Kazumasa Tsukamoto, Anjo (JP); Takamitsu Kuroyanagi, Anjo (JP); Takuya Inagaki, Gamagori (JP); Sachio Honjo, Anjo (JP); Takenori Kanou, Toyota (JP)

(73) Assignee: Aisin AW Co., Ltd., Anjo (JP)

( * ) Notice: Subject to any disclaimer, the term of this patent is extended or adjusted under 35 U.S.C. 154(b) by 307 days.

(21) Appl. No.: 13/231,346

(22) Filed: Sep. 13, 2011

(65) Prior Publication Data
US 2012/0061199 A1    Mar. 15, 2012

(30) Foreign Application Priority Data
Sep. 13, 2010   (JP) ................................ 2010-204749

(51) Int. Cl.
  *F16H 41/24*   (2006.01)
  *F16H 45/02*   (2006.01)
  *F16D 3/06*    (2006.01)

(52) U.S. Cl.
  USPC ............................... 192/3.29; 464/98; 60/330

(58) Field of Classification Search
  USPC ............................................ 192/200; 464/98
  See application file for complete search history.

(56) References Cited

U.S. PATENT DOCUMENTS

| | | | | |
|---|---|---|---|---|
| 2,913,925 A | * | 11/1959 | Smirl ............................. | 74/433.5 |
| 4,154,325 A | * | 5/1979 | Hiraiwa et al. .............. | 192/3.33 |
| 4,580,668 A | | 4/1986 | Pickard et al. | |
| 6,026,941 A | | 2/2000 | Maienschein et al. | |
| 8,439,764 B2 | * | 5/2013 | Avins ............................... | 464/98 |
| 2001/0017248 A1 | * | 8/2001 | Inoue et al. ................... | 192/3.21 |
| 2002/0134632 A1 | | 9/2002 | Arhab et al. | |
| 2006/0000682 A1 | * | 1/2006 | Yamamoto et al. .......... | 192/3.29 |
| 2007/0287338 A1 | | 12/2007 | Miyata et al. | |

FOREIGN PATENT DOCUMENTS

| | | |
|---|---|---|
| JP | A-59-83833 | 5/1984 |
| JP | A-9-159005 | 6/1997 |
| JP | A-10-331949 | 12/1998 |
| JP | A-2000-145921 | 5/2000 |
| JP | A-2004-502103 | 1/2004 |
| JP | A-2007-147034 | 6/2007 |
| JP | A-2007-315496 | 12/2007 |

OTHER PUBLICATIONS

Nov. 1, 2011 Search Report issued in International Application No. PCT/JP2011/069349 (w/Translation).

* cited by examiner

*Primary Examiner* — Richard M. Lorence
(74) *Attorney, Agent, or Firm* — Oliff & Berridge, PLC (57) ABSTRACT

A drive plate that has a ring gear capable of meshing with a gear of a motor, and that transmits power from the engine to an element to which the power is to be transmitted. The drive plate includes a plate member that is fixed to a crankshaft of the engine. A ring gear member is formed as an annular member having the ring gear in its outer periphery. A plurality of fastening portions are each fastened to the plate member on an inner peripheral side with respect to the ring gear. A plurality of extended weld portions each extend from the inner peripheral side with respect to the ring gear to a side of the element, each having a free end that is welded to an outer periphery of a constituent member of the element to which the power is to be transmitted.

11 Claims, 10 Drawing Sheets

DRIVE PLATE AND RING GEAR MEMBER OF DRIVE PLATE

INCORPORATION BY REFERENCE

The disclosure of Japanese Patent Application No. 2010-204749 filed on Sep. 13, 2010, including the specification, drawings and abstract is incorporated herein by reference in its entirety.

BACKGROUND OF THE INVENTION

The present invention relates to a drive plate that transmits power from an engine to an element to which the power is to be transmitted, and a ring gear member that faints the drive plate.

DESCRIPTION OF THE RELATED ART

Conventionally, a torque converter that includes at least three set blocks, which are fixed to the same radial positions on a front face of a front cover by welding and to which a drive plate fixed to a crankshaft of an engine is fixed by bolts, and an annular ring gear having a gear formed on its outer peripheral surface, and that has the ring gear fitted on an outer peripheral surface of each set block and fixed to each set block by welding has been proposed as a torque converter that is connected to an automatic transmission for automobiles (see, e.g., Japanese Patent Application Publication No. JP-A-H09-159005). This torque converter allows the ring gear to be attached to the torque converter without requiring any additional welding portion on an outer shell of the torque converter, and allows concentricity between the ring gear and the crankshaft to be ensured without using any jig.

SUMMARY OF THE INVENTION

As in the above related art, in the case of transmitting power from the engine via the drive plate to the torque converter as an element to which the power is to be transmitted, a plurality of set blocks need be firmly welded to the front face of the front cover of the torque converter in order to provide resistance to the torque from the engine side. However, if the set blocks are welded to the front cover so as to ensure sufficient attachment strength, the front face of the front cover may be thermally distorted by the welding. Such thermal distortion of the front face of the front cover may cause a problem such as, e.g., judders that are caused by the distortion of the front cover during operation (slip control or engagement) of a lockup clutch including a lockup piston capable of frictionally engaging the back face of the front cover. Moreover, in the above related art, the ring gear becomes dull due to the heat associated with the welding of the set blocks to the front face of the front cover and the welding of the ring gear to the set blocks, which may reduce surface hardness of the ring gear. Furthermore, coupling the drive plate to the front cover of the torque converter via the set blocks as in the above related art increases the number of parts.

It is a primary object of a drive plate and a ring gear member of the drive plate according to the present invention to reduce the influence of welding heat on a constituent member of an element to which power is to be transmitted and a ring gear, and to reduce the number of parts.

In order to achieve the above primary object, the drive plate and the ring gear member of the drive plate according to the present invention adopts the following means.

A drive plate according to a first aspect of the present invention that has a ring gear capable of meshing with a gear of a motor for cranking an engine, and that transmits power from the engine to an element to which the power is to be transmitted includes: a plate member that is fixed to a crankshaft of the engine; and a ring gear member that is formed as an annular member having the ring gear in its outer periphery, and that includes a plurality of fastening portions each fastened to the plate member on an inner peripheral side with respect to the ring gear, and a plurality of extended weld portions each extended from the inner peripheral side with respect to the ring gear to a side of the element to which the power is to be transmitted, and each having a free end that is welded to an outer periphery of a constituent member of the element to which the power is to be transmitted.

This drive plate is formed by the plate member that is fixed to the crankshaft of the engine, and the ring gear member as the annular member that has the ring gear in its outer periphery and that is fastened to the plate member. The ring gear member includes the plurality of fastening portions each fastened to the plate member on the inner peripheral side with respect to the ring gear, and the plurality of extended weld portions each extended from the inner peripheral side with respect to the ring gear to the side of the element to which the power is transmitted, and each having the free end that is welded to the outer periphery of the constituent member of the element to which the power is to be transmitted. Thus, the plurality of extended weld portions are extended from a portion of the ring gear member located on the inner peripheral side with respect to the ring gear to the side of the element to which the power is transmitted, and the free end of each extended weld portion is welded to the outer periphery of the constituent member of the element to which the power is to be transmitted. This can reduce the influence of welding heat on a radially extending portion of the constituent member, and also allows a sufficient gap to be secured between the ring gear and a welded portion where the free end of each extended weld portion and the constituent member of the element to which the power is to be transmitted are welded together, thereby reducing the influence of the welding heat on the ring gear. Moreover, this drive plate allows the ring gear member to be fixed to the element to which the power is to be transmitted, without using any set block, whereby the number of parts can be reduced. Furthermore, since this drive plate has a two-part structure including the plate member and the ring gear member, the drive plate can make a sound that is made when the motor cranks the engine more preferable.

The ring gear member may include an annular support member that has both the plurality of fastening portions and the plurality of extended weld portions on an inner peripheral side, and that has the ring gear fixed to an outer periphery. Since the ring gear member can be divided into two parts, namely the annular support member and the ring gear, the ring gear produced separately from the annular support member can be fixed to the annular support member. Accordingly, the step of forming a gear on the outer periphery of the ring gear member can be omitted, thereby facilitating manufacturing of the ring gear member. Moreover, the ring gear does not contribute to power transmission from the engine to the element to which the power is to be transmitted, and torque that is applied to the ring gear when cranking the engine is not so large. Thus, in the case of fixing the ring gear to the annular support member by press-fitting or clinching, or in the case of fixing the ring gear to the annular support member by welding, the welding region (the welding length) between the ring gear and the annular support member can also be significantly reduced, whereby dulling of the ring gear by heat can be satisfactorily suppressed. In addition, the drive plate including this ring gear member has a three-part structure including the plate member, the annular support member, and the ring gear. Thus, the drive plate can make the sound that is made when the motor cranks the engine further more preferable.

Moreover, the element to which the power is to be transmitted may be a hydraulic transmission apparatus that includes a front cover and a single-plate lockup clutch having a lockup piston capable of frictionally engaging with a radially extending inner surface of the front cover, and the respective free ends of the plurality of extended weld portions may be welded to an outer periphery of the front cover. Thus, in the case where the present invention is applied to the hydraulic transmission apparatus that includes the single-plate lockup clutch having the lockup piston capable of frictionally engaging with the radially extending inner surface of the front cover, thermal distortion due to welding can be suppressed in the radially extending portion of the front cover facing the lockup piston (a friction material). Thus, the use of the drive plate can satisfactorily suppress judders due to thermal distortion of the front cover during operation of the lockup clutch.

The hydraulic transmission apparatus may include a pump shell that is fixed to the front cover, and the front cover, the pump shell, and the free ends of the plurality of extended weld portions may be welded together at a joint between the front cover and the pump shell of the hydraulic transmission apparatus. This allows the front cover, the pump shell, and the plurality of extended weld portions of the ring gear member to be simultaneously welded together, whereby the number of welding steps can be reduced. Moreover, this configuration allows a sufficient gap to be secured between the welded portion where the front cover, the pump shell, and the plurality of extended weld portions of the ring gear member are welded together and the radially extending portion of the front cover, and also allows a sufficient gap to be secured between this welded portion and the ring gear. This can further reduce the influence of the welding heat on the ring gear and the radially extending portion of the front cover.

Moreover, a nut, which is capable of self-piercing a bolt hole in the fastening portion, may be fixed to each of the fastening portions of the ring gear member by clinching. This allows the nuts to be easily fixed to the fastening portions while forming in the fastening portions the bolt holes through which bolts required to fasten the plate member to the ring gear member are inserted, when forming (e.g., pressing) the ring gear member.

The ring gear member may be formed by processing an annular body that is cut out from a plate material, and the plate member may be formed by processing an inner remaining portion that is obtained by cutting out the annular body from the plate material. Thus, the plate member and the ring gear member can be produced by so-called nesting, whereby the plate material can be effectively used, and yield can be improved.

A ring gear member for a drive plate according to a second aspect of the present invention, which has in its outer periphery a ring gear capable of meshing with a gear of a motor for cranking an engine, and that forms, together with a plate member that is fixed to a crankshaft of the engine, a drive plate that transmits power from the engine to an element to which the power is to be transmitted, includes: a plurality of fastening portions each fastened to the plate member on an inner peripheral side with respect to the ring gear; and a plurality of extended weld portions each extended from the inner peripheral side with respect to the ring gear to a side of the element to which the power is transmitted, and each having a free end that is welded to an outer periphery of a constituent member of the element to which the power is to be transmitted.

This ring gear member forms, together with the plate member that is fixed to the crankshaft of the engine, the drive plate that transmits the power from the engine to the element to which the power is to be transmitted, and includes the plurality of fastening portions each fastened to the plate member on the inner peripheral side with respect to the ring gear, and the plurality of extended weld portions each extended from the inner peripheral side with respect to the ring gear to the side of the element to which the power is transmitted, and each having the free end that is welded to the outer periphery of the constituent member of the element to which the power is to be transmitted. Thus, the plurality of extended weld portions are extended from a portion of the ring gear member located on the inner peripheral side with respect to the ring gear to the side of the element to which the power is transmitted, and the free end of each extended weld portion is welded to the outer periphery of the constituent member of the element to which the power is to be transmitted. This can reduce the influence of welding heat on a radially extending portion of the constituent member, and also allows a sufficient gap to be secured between the ring gear and a welded portion where the free end of each extended weld portion and the constituent member of the element to which the power is to be transmitted are welded together, thereby reducing the influence of the welding heat on the ring gear. Moreover, this ring gear member can be fixed to the element to which the power is to be transmitted, without using any set block, whereby the number of parts can be reduced. Furthermore, since the drive plate including this ring gear member has a two-part structure including the plate member and the ring gear member, the drive plate can make the sound that is made when the motor cranks the engine more preferable.

DETAILED DESCRIPTION OF THE EMBODIMENT

An embodiment of the present invention will be described.

Figure 1:
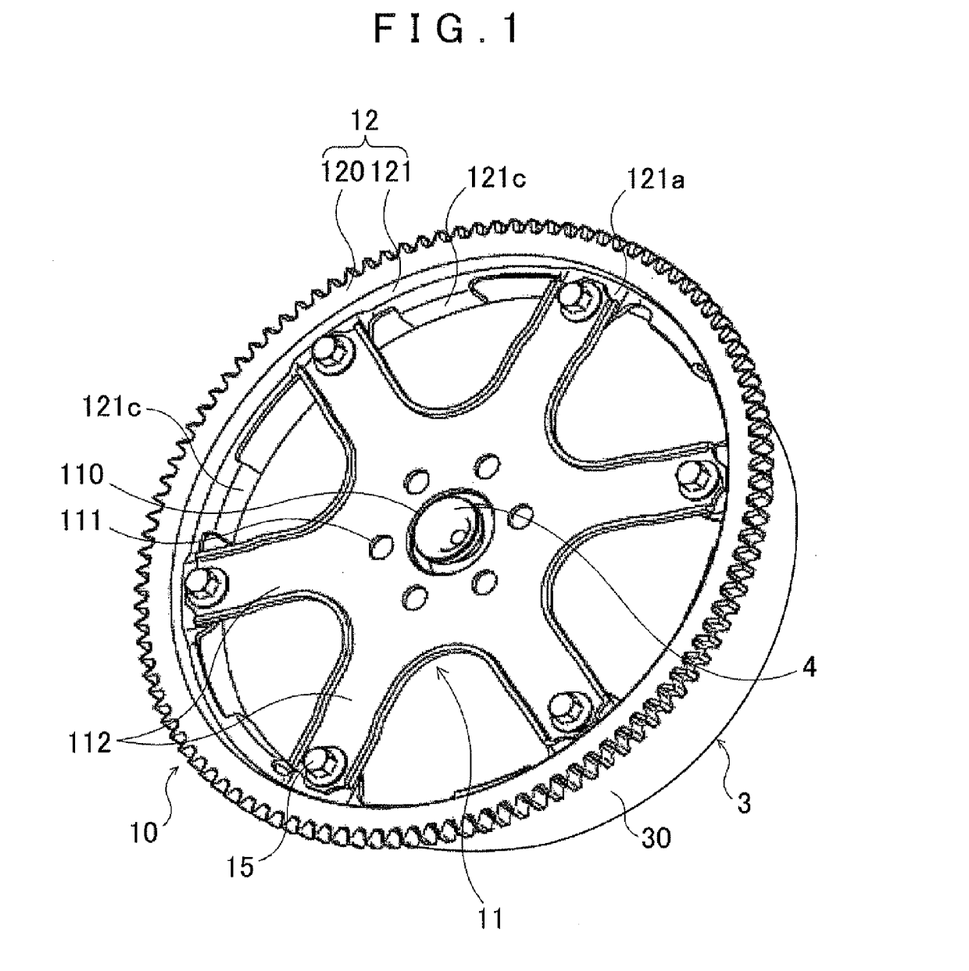
FIG. 1 is a perspective view of a drive plate 10 according to an embodiment of the present invention.
Figure 2:
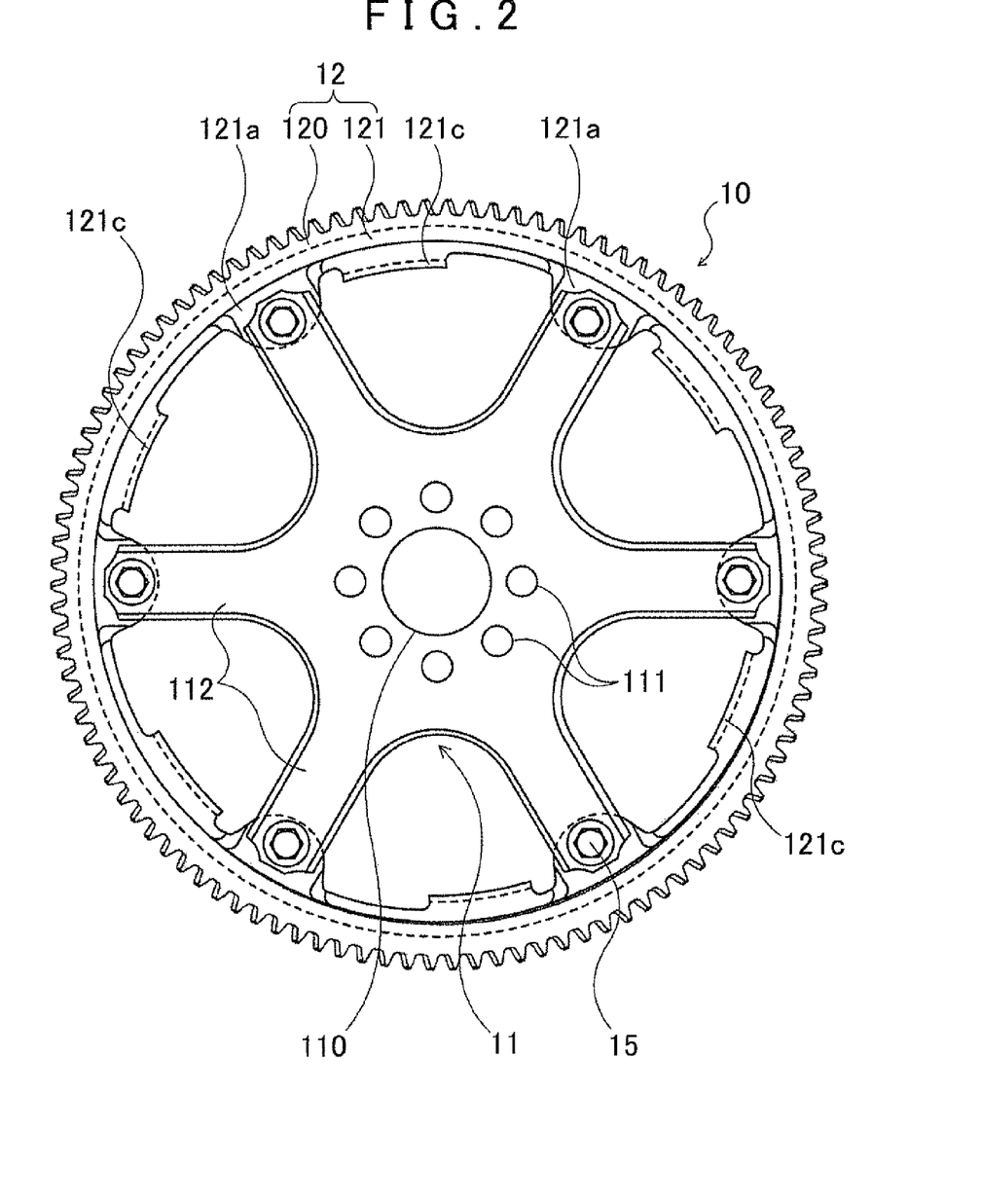
FIG. 2 is a plan view showing the drive plate 10 according to the embodiment.
Figure 3:
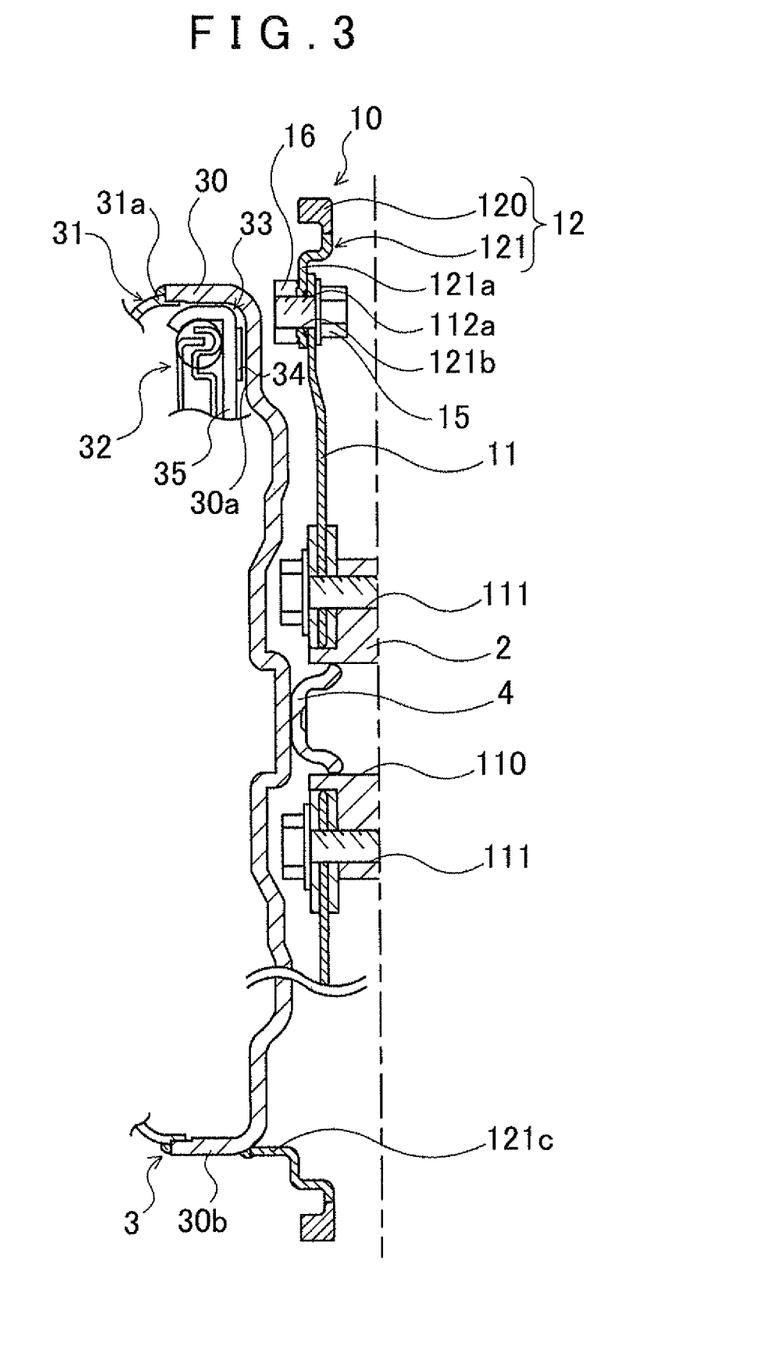
FIG. 3 is a cross-sectional view showing a state in which the drive plate 10 according to the embodiment is attached.

FIG. 1 is a perspective view of a drive plate 10 according to an embodiment of the present invention, FIG. 2 is a plan view of the drive plate 10, and FIG. 3 is a cross-sectional view showing a state in which the drive plate 10 is attached. The drive plate 10 shown in these drawings is used to transmit power, which is output from an engine (an internal combustion engine), not shown, as a motor mounted on a vehicle, to a hydraulic transmission apparatus 3 as an element to which the power is to be transmitted. In the embodiment, the hydraulic transmission apparatus 3 as the element to which the power is to be transmitted is a torque converter that is mounted as a starting apparatus on the vehicle including the engine as the motor. That is, as shown in FIG. 3, the hydraulic transmission apparatus 3 includes a front cover 30 that is coupled to a crankshaft 2 of the engine via the drive plate 10, a pump impeller 31 including a pump shell 31a firmly fixed to the front cover 30, a turbine runner (not shown) that is rotatable coaxially with the pump impeller 31, a turbine hub (not shown) that is fixed to an input shaft of a transmission apparatus (not shown) and connected to the turbine runner, a damper mechanism 32 connected to the turbine hub, a single-plate friction lockup clutch 33 capable of engaging (coupling) the front cover 30 with the damper mechanism 32 and of releasing the engagement (coupling) therebetween, etc. The lockup clutch 33 of the embodiment includes a lockup piston 35 having a friction material 34 capable of frictionally engaging with a radially extending inner surface 30a of the front cover 30.

As shown in FIGS. 1 to 3, the drive plate 10 of the embodiment is formed by a plate member 11 that is fixed to the crankshaft 2 of the engine, and an annular ring gear member 12 that has a ring gear 120 on its outer periphery, is capable of being fastened to the plate member 11, and is fixed to the hydraulic transmission apparatus 3. That is, the drive plate 10 of the embodiment can be divided into two parts, namely the plate member 11 that is attached to the engine side, and the ring gear member 12 that is attached to the hydraulic transmission apparatus 3. Thus, the plate member 11 and the ring gear 12 can be fastened together after the plate member 11 is attached to the crankshaft 2 of the engine, and the ring gear member 12 is attached to the hydraulic transmission apparatus 3.

Figure 4:
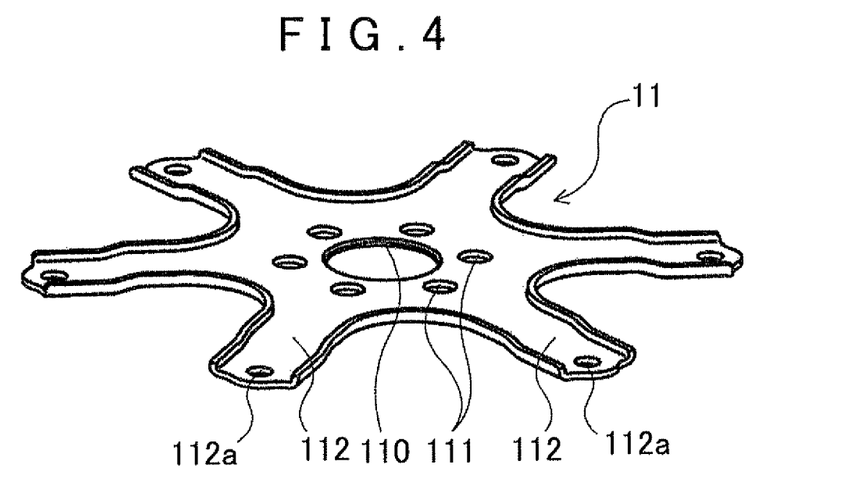
FIG. 4 is a perspective view of a plate member 11 that forms the drive plate 10 according to the embodiment.

The plate member 11 is formed by a flexible plate material such as, e.g., a cold rolled steel sheet, and as shown in FIG. 4, includes a central hole 110 fowled in the center of the plate member 11, a plurality of (six in the embodiment) crankshaft coupling holes 111 arranged at regular intervals around the central hole 110, and a plurality of (six in the embodiment) radial portions 112 extending outward in a radial pattern from a central portion of the plate member 11, and each having a fastening hole 112a formed near a radially outer end of the radial portion 112. As shown in FIG. 3, a tip end of the crankshaft 2 is fitted in the central hole 110 of the plate member 11, and an input-side centerpiece 4 fixed to the center of an outer surface of the front cover 30 of the hydraulic transmission apparatus 3 is fitted in a hole formed in the center of the tip end of the crankshaft 2. The crankshaft 2 and the plate member 11 are fastened together by bolts respectively inserted through the crankshaft coupling holes 111 via spacers respectively placed on the front and rear sides of the plate member 11.

Figure 5:
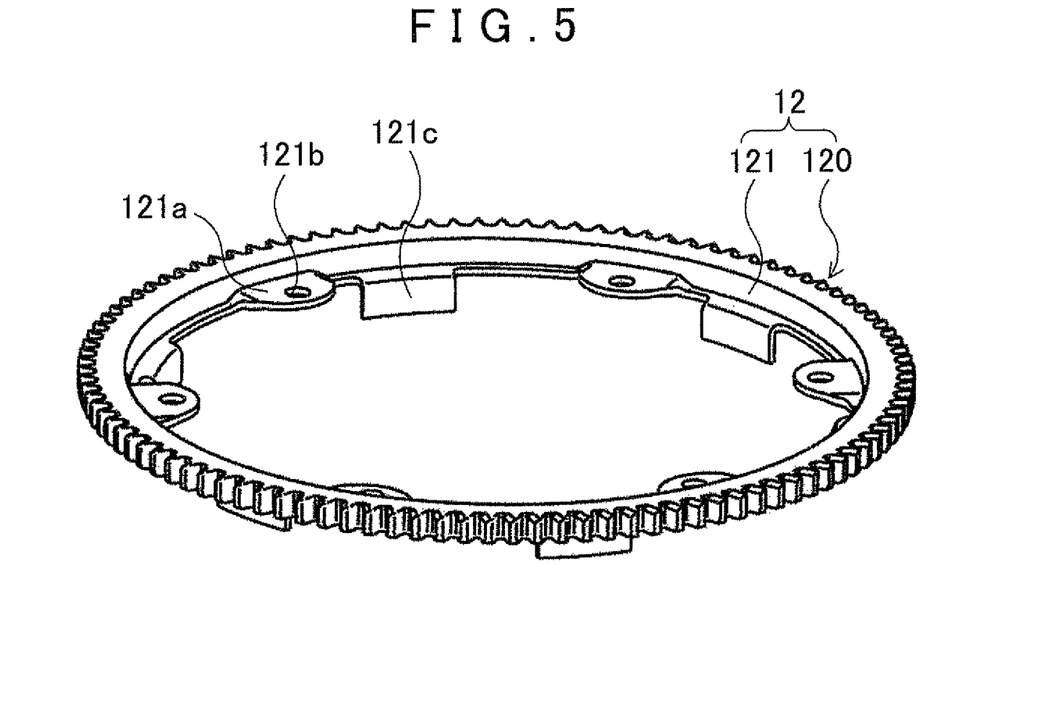
FIG. 5 is a perspective view of a ring gear member 12 that forms the drive plate 10 according to the embodiment.

As shown in FIG. 5, the ring gear member 12 includes the ring gear 120 that is coupled to a rotor of a starter motor, not shown, for cranking the engine, and that is capable of meshing with a pinion gear that is moved toward the drive plate 10 when starting the engine, and an annular support member 121 that has a substantially annular shape, that has the ring gear 120 fixed to the outer periphery of the annular support member 121, that is capable of being fastened to the plate member 11, and that is fixed to the front cover 30 of the hydraulic transmission apparatus 3. As can be seen from FIG. 6, in the embodiment, the ring gear 120 is manufactured separately from the annular support member 121 by using, e.g., an existing ring gear manufacturing facility, and is fixed to the outer periphery of the annular support member 121 by press-fitting, clinching, or welding.

Figure 7:
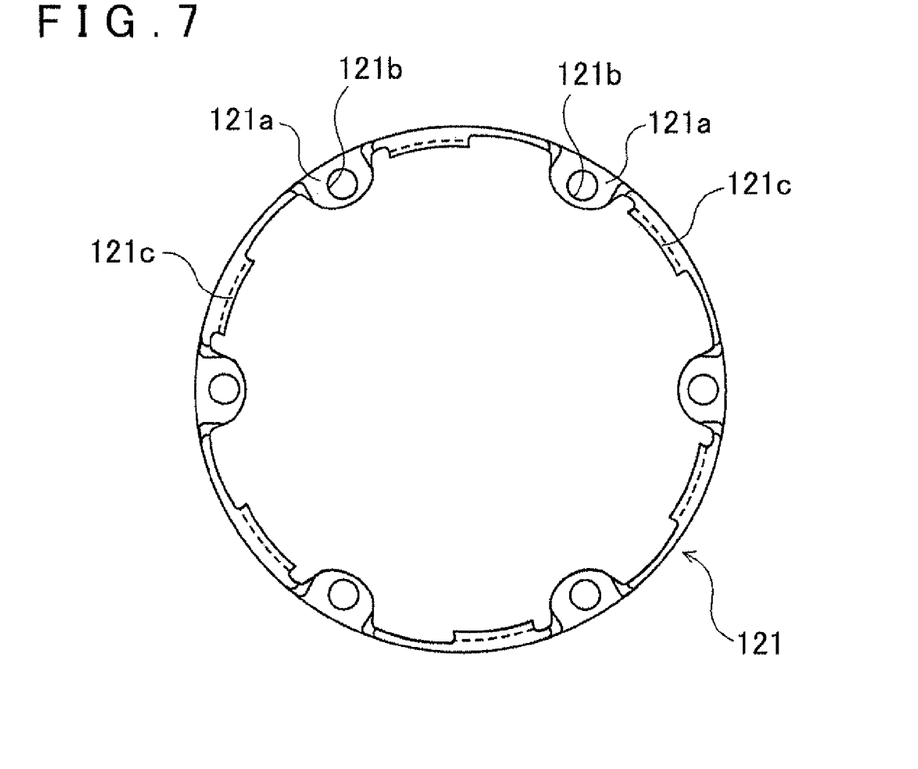
FIG. 7 is a plan view showing an annular support member 121 that forms the ring gear member 12.

The annular support member 121 is formed by a flexible plate material such as, e.g., a cold rolled steel sheet, and as shown in FIG. 7, has a plurality of (six in the embodiment) fastening portions 121a extended radially inward (toward the center) from an inner peripheral portion of the annular support member 121 so as to correspond to the plurality of radial portions 112 of the plate member 11, respectively. Fastening holes 121b are respectively formed in the fastening portions 121a so as to correspond to the fastening holes 112a formed in the radial portions 112 of the plate member 11. The plate member 11 and the ring gear member 12 are fastened together by bolts 15 and nuts 16 that are inserted through the fastening holes 112a of the radial portions 112 of the plate member 11 and the fastening holes 121b of the annular support member 121 of the ring gear member 12. The nuts 16 that are used in the embodiment are nuts (e.g., self-piercing and clinch nuts) that are capable of self-piercing the fastening holes 121b in the fastening portions 121a and are respectively fixed to the fastening portions 121a by clinching when forming (pressing) the fastening portions 121a of the annular support member 121.

The annular support member 121 has a plurality of (six in the embodiment) extended weld portions 121c each extended from a position between adjacent ones of the fastening portions 121a in the inner peripheral portion in an axial direction of the crankshaft 2 and the hydraulic transmission apparatus 3 to the hydraulic transmission apparatus 3 side. As shown in FIG. 3, each extended weld portion 121c is formed by bending as appropriate, and is formed so that its free end contacts an outer peripheral portion 30b of the front cover 30 of the hydraulic transmission apparatus 3. The free end of each extended weld portion 121c is welded to the outer peripheral portion 30b of the front cover 30 along a contact portion therebetween. The welding length of the free end of each extended weld portion 121c and the outer peripheral portion 30b of the front cover 30 is determined so as to provide resistance to the torque that is transferred from the engine to the front cover 30. Thus, the free end of each extended weld portion 121c and the front cover 30 need not necessarily be welded together along the entire contact portion.

The drive plate 10 configured as described above is interposed between the crankshaft 2 of the engine and the hydraulic transmission apparatus 3 by fixing the plate member 11 to the crankshaft 2 of the engine, fixing the ring gear member 12 to the front cover 30 of the hydraulic transmission apparatus 3, and fastening the plate member 11 and the ring gear member 12 together. Power that is output from the engine is transmitted to the front cover 30 of the hydraulic transmission apparatus 3 via the crankshaft 2, the plate member 11, the annular support member 121 of the ring gear member 12, and each extended weld portion 121c of the annular support member 121, and is further transmitted to the transmission apparatus, not shown, by the hydraulic transmission apparatus 3. When cranking and starting the engine by the starter motor, cranking torque from the starter motor is transferred to the crankshaft 2 of the engine via the ring gear 120 meshing with the pinion gear of the starter motor, the annular support member 121, and the plate member 11.

Procedures for manufacturing the plate member 11 and the ring gear member 12 that form the drive plate 10 of the embodiment and procedures for attaching the drive plate 10 to the hydraulic transmission apparatus 3 will be described below with reference to FIGS. 8 to 10.

Figure 8:
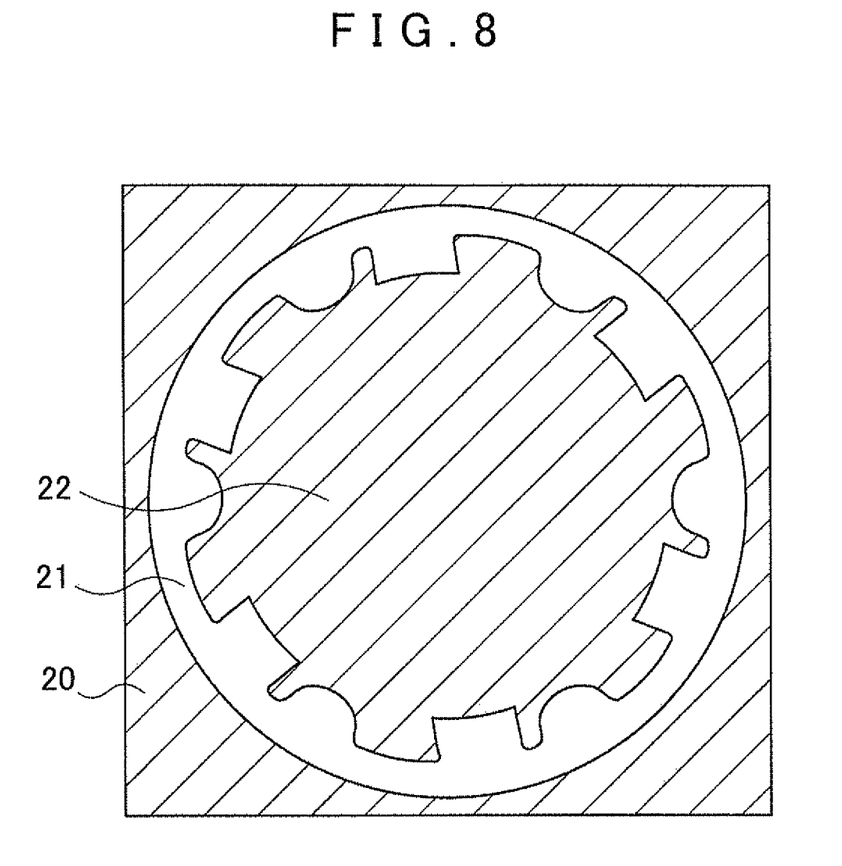
FIG. 8 is an illustration illustrating procedures for manufacturing the drive plate 10 according to the embodiment.
Figure 9:
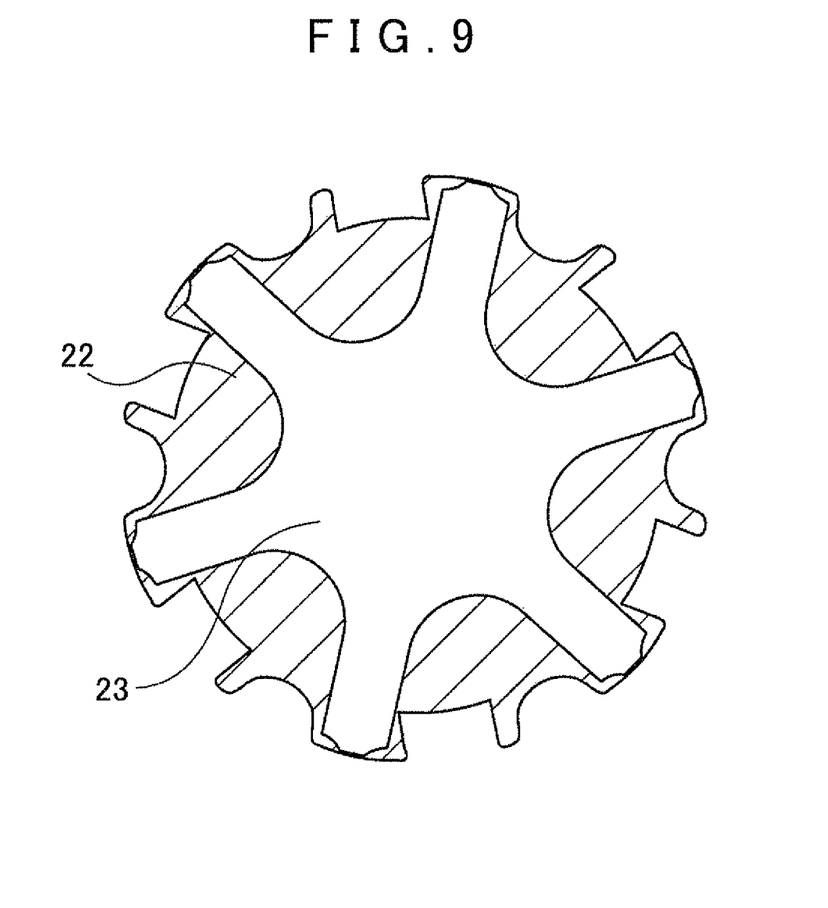
FIG. 9 is an illustration illustrating the procedures for manufacturing the drive plate 10 according to the embodiment.

When manufacturing the plate member 11 and the ring gear member 12 that form the drive plate 10, as shown in FIG. 8, an annular body 21 (a non-hatched region in FIG. 7), which serves as a base for the annular support member 121 of the ring gear member 12, is first cut out from a plate material 20 such as, e.g., a cold rolled steel sheet. A remaining portion 22, which serves as a base for the plate member 11, is obtained together with the annular body 21 by cutting out the annular body 21 from the plate material 20. Thus, at least the annular support member 121 of the ring gear member 12 and the plate member 11 can be produced by so-called nesting, whereby the plate material 20 can be effectively used, and yield can be increased. Next, the annular body 21 thus cut out from the plate material 20 is pressed, etc. to form the fastening portions 121a, the extended weld portions 121c, etc., thereby producing the annular support member 121 shown in FIG. 7. As shown in FIG. 9, the remaining portion 22 obtained by cutting out the annular body 21 from the plate material 20 is cut into a member 23 that serves as a base for the plate member 11, and the member 23 is pressed, etc. to obtain the plate member 11 shown in FIG. 4.

Figure 6:
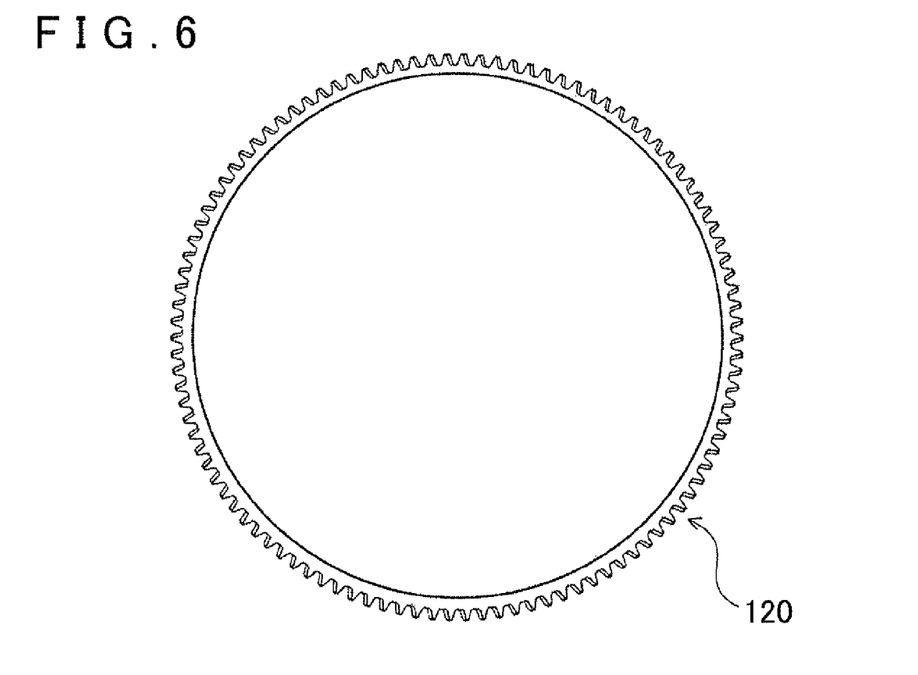
FIG. 6 is a plan view showing a ring gear 120 that forms the ring gear member 12.

Then, the annular support member 121 is press-fitted in the inner periphery of the ring gear 120 shown in FIG. 6, which is manufactured separately from the annular support member 121, or the annular support member 121 is fixed to the inner periphery of the ring gear 120 by clinching or welding, whereby the ring gear member 12 shown in FIG. 5 can be obtained. When cranking the engine, torque that is applied from the starter motor to the ring gear 120 and the annular support member 121 is not so large. Accordingly, the ring gear 120 and the annular support member 121 can be kept in a firmly fixed state over a long period of time even if the ring gear 120 and the annular support member 121 are fixed together by press-fitting or clinching. Moreover, in the case of fixing the ring gear 120 and the annular support member 121 together by welding, the welding region (the welding length) therebetween can be significantly reduced. Note that the ring gear 120 may be produced from a remaining portion (a portion outside the annular body 21) of the plate material 20 which remains after cutting out the annular body 21.

Figure 10:
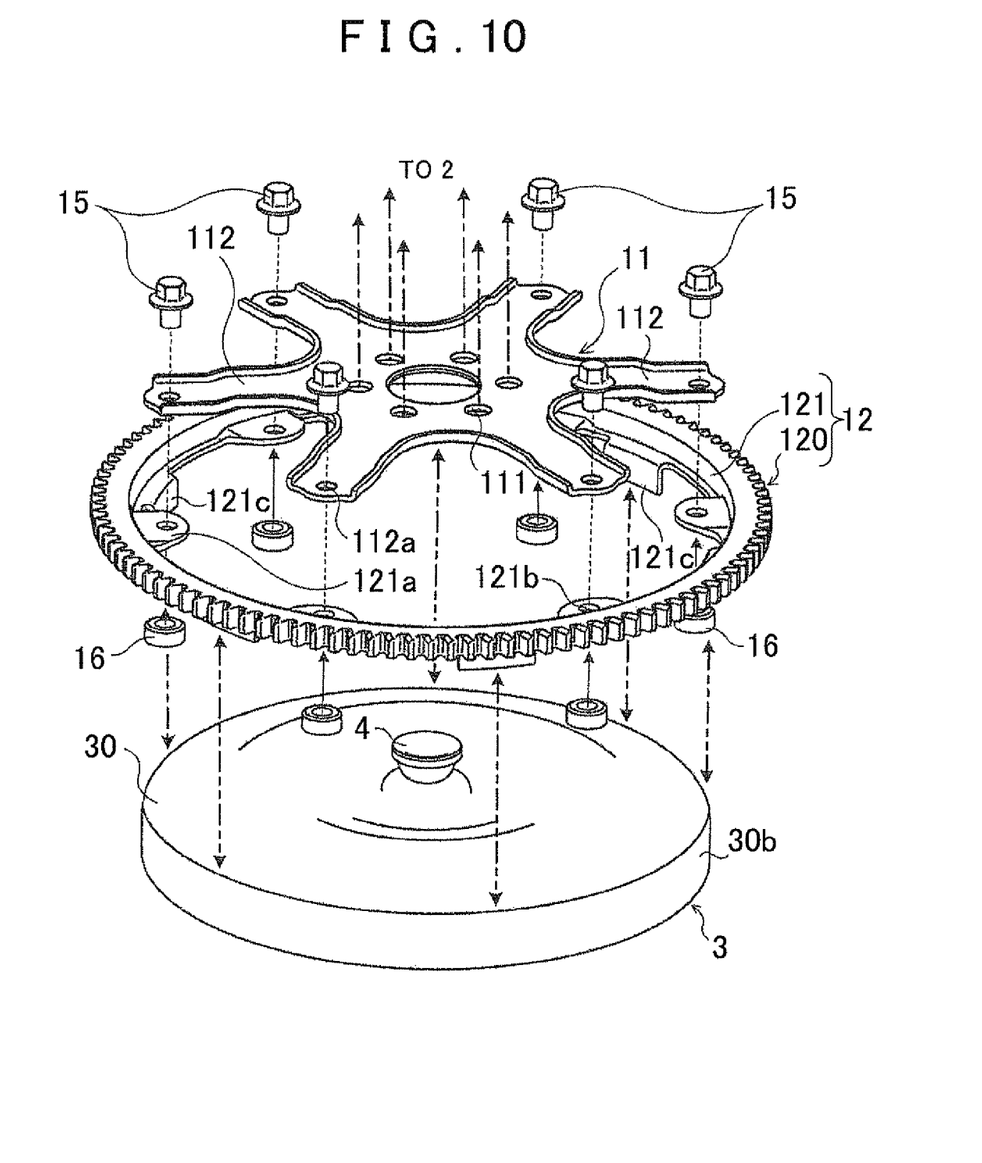
FIG. 10 is an exploded perspective view showing procedures for assembling the plate member 11 and the ring gear member 12 that form the drive plate 10 of the embodiment to a crankshaft 2 and a hydraulic transmission apparatus 3.

The procedures for attaching the plate member 11 and the ring gear member 12 of the drive plate 10, manufactured as described above, to the crankshaft 2 and the hydraulic transmission apparatus 3 are shown in FIG. 10. The plate member 11 that forms the drive plate 10 of the embodiment is fastened to the crankshaft 2 by the bolts inserted through the crankshaft coupling holes 111 via the spacers placed on the front and back sides of the plate member 11 in, e.g., an engine assembly plant, etc. (see one-dot chain lines in FIG. 10). The ring gear member 12 that forms the drive plate 10 of the embodiment is fixed to the hydraulic transmission apparatus 3 by welding the free end of each extended weld portion 121c of the annular support member 121 to the outer peripheral portion 30b of the front cover 30 in, e.g., an assembly plant of the hydraulic transmission apparatus 3, etc. (see two-dot chain lines in FIG. 10). Thus, the plurality of extended weld portions 12k are extended from a portion of the ring gear member 12 located on the inner peripheral side with respect to the ring gear 120, namely from a portion on the inner peripheral side of the annular support member 121, to the hydraulic transmission apparatus 3 side, and the free end of each extended weld portion 121c is welded to the outer peripheral portion 30b of the front cover 30 of the hydraulic transmission apparatus 3. This can reduce the influence of welding heat on a radially extending portion of the front cover 30, that is, a portion including the radially extending inner surface 30a of the front cover 30 facing the friction material 34 of the lockup piston 35, and also allows a sufficient gap to be secured between the ring gear 120 and the welded portion where the free end of each extended weld portion 121c and the front cover 30 of the hydraulic transmission apparatus 3 are welded together, thereby reducing the influence of the welding heat on the ring gear 120.

The plate member 11 thus attached to the engine side and the ring gear member 12 attached to the hydraulic transmission apparatus 3 are fastened together by inserting the bolts 15 into the fastening holes 112a of the plate member 11 and the fastening holes 121b of the ring gear member 12 and screwing the bolts 15 into the nuts 16 fixed to the annular support member 121 in, e.g., a vehicle assembly plant, etc. Note that in the ring gear member 12 of the embodiment, the nuts 16 are respectively fixed to the fastening portions 121a by clinching when pressing the annular support member 121, etc. In FIG. 10, in order to facilitate understanding of the structure of the drive plate 10, the nuts 16 are shown separated from the annular support member 121 (the fastening portions 121a). The procedures for interposing the drive plate 10 between the engine and the hydraulic transmission apparatus 3 are not limited to those described above, and the drive plate 10 may be interposed between the engine and the hydraulic transmission apparatus 3 after fixing the plate member 11 and the ring gear member 12 together.

As described above, the drive plate 10 of the embodiment is formed by the plate member 11 that is fixed to the crankshaft 2 of the engine, and the ring gear member 12 as an annular member that has the ring gear 120 in its outer periphery and that is fastened to the plate member 11. The ring gear member 12 includes the plurality of fastening portions 121a each fastened to the plate member 11 on the inner peripheral side with respect to the ring gear 120, and the plurality of extended weld portions 12k each extended from the inner peripheral side with respect to the ring gear to the hydraulic transmission apparatus 3 side as an element to which power is to be transmitted, and each having the free end that is welded to the outer peripheral portion 30b of the front cover 30 as a constituent member of the hydraulic transmission apparatus 3.

Thus, the plurality of extended weld portions 121c are extended from the portion of the ring gear member 12 located on the inner peripheral side with respect to the ring gear 120 to the hydraulic transmission apparatus 3 side, and the free end of each extended weld portion 121c is welded to the outer peripheral portion 30b of the front cover 30 of the hydraulic transmission apparatus 3. This can reduce the influence of the welding heat on the radially extending portion (the inner surface 30a) of the front cover 30 facing the friction material 34 of the lockup piston 35. Thus, the drive plate 10 of the embodiment can satisfactorily suppress judders due to thermal distortion of the front cover 30 during operation of the lockup clutch 33. Moreover, the drive plate 10 of the embodiment can secure a sufficient gap between the ring gear 120 and the welded portion where the free end of each extended weld portion 121c of the ring gear member 12 and the front cover 30 (the outer peripheral portion 30b) of the hydraulic transmission apparatus 3 are welded together, thereby reducing the influence of the welding heat on the ring gear 120. Furthermore, the drive plate 10 of the embodiment allows the ring gear member 12 to be fixed to the front cover 30 (the hydraulic transmission apparatus 3) without using any set block, whereby the number of parts can be reduced. Moreover, since no set block is required, no space need be secured between the front cover 30 of the hydraulic transmission apparatus 3 and the drive plate 10 to place the set block therein. Furthermore, according to the drive plate 10 of the embodiment, the drive plate 10 can be adapted to the hydraulic transmission apparatus 3 of various sizes (outer diameters) by merely adjusting the length of the extended weld portions 12k, the direction (angle) in which each extended weld portion 121c is extended, etc. according to the outer diameter of the hydraulic transmission apparatus 3. This can increase flexibility in attachment of the drive plate 10 to the hydraulic transmission apparatus 3. In addition, since the drive plate 10 of the embodiment has a two-part structure including the plate member 11 and the ring gear member 12, the drive plate 10 can make a sound that is made when the starter motor cranks the engine more preferable.

The ring gear member 12 that forms the drive plate 10 of the embodiment includes the annular support member 121 having both the plurality of fastening portions 121a and the plurality of extended weld portions 12k on the inner peripheral side thereof, and having the ring gear 120 fixed to the outer periphery thereof. Since the ring gear member 12 can be divided into two parts, namely the annular support member 121 and the ring gear 120, the ring gear 120 produced separately from the annular support member 121 can be fixed to the annular support member 121. Accordingly, the step of forming a gear on the outer periphery of the ring gear member 12 can be omitted, thereby facilitating manufacturing of the ring gear member 12. Moreover, the ring gear 120 does not contribute to power transmission from the engine to the hydraulic transmission apparatus 3, and the torque that is applied to the ring gear 120 when cranking the engine is not so large. Thus, in the case of fixing the ring gear 120 to the annular support member 121 by press-fitting or clinching, or in the case of fixing the ring gear 120 to the annular support member 121 by welding, the welding region (the welding length) between the ring gear 120 and the annular support member 121 can also be significantly reduced, whereby dulling (softening) of the ring gear 120 by heat can be satisfactorily suppressed. In addition, since the ring gear member 12 can be divided into two parts, namely the annular support member 121 and the ring gear 120, as in the above embodiment, the drive plate 10 has a three-part structure including the plate member 11, the annular support member 121, and the ring gear 120. Thus, the drive plate 10 can make the sound that is made when the starter motor cranks the engine further more preferable. It is to be understood that the ring gear 120 and the annular support member 121 may be formed as an integral member by forming a ring gear directly on the outer periphery of the annular support member 121 instead of dividing the ring gear member 12 into two parts, namely the ring gear 120 and the annular support member 121.

Moreover, in the above embodiment, the nuts 16 capable of self-piercing the fastening holes 121b (bolt holes) in the fastening portions 121a are respectively fixed to the fastening portions 121a of the ring gear member 12 by clinching. This allows the nuts 16 to be easily fixed to the fastening portions 121a while forming in the fastening portions 121a the fastening holes 121b (the bolt holes) through which the bolts 15 required to fasten the plate member 11 to the ring gear member 12 are inserted, when forming (e.g., pressing) the ring gear member 12. Moreover, the annular support member 121 that forms the ring gear member 12 of the embodiment is formed by processing the annular body 21 that is cut out from the plate material 20, and the plate member 11 is formed by processing the inner remaining portion 22 that is obtained by cutting out the annular body 21 from the plate material 20. Thus, the plate member 11 and the annular support member 121 (the ring gear member 12) can be produced by so-called nesting, whereby the plate material 20 can be effectively used, and the yield can be improved.

Figure 11:
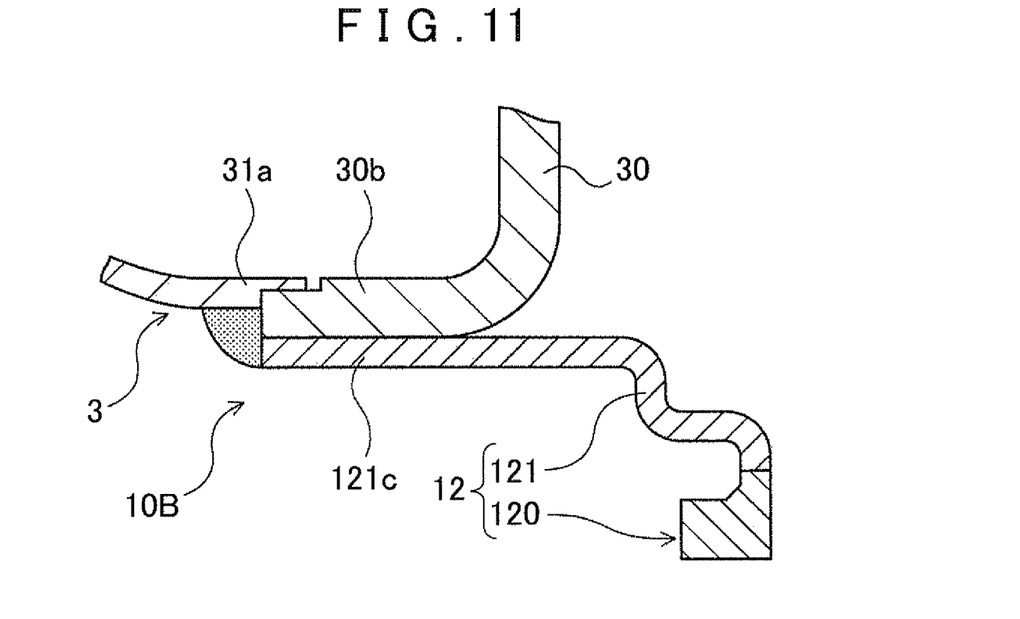
FIG. 11 is an enlarged cross-sectional view showing a main part of a drive plate 10B according to a modification example.

Note that in the drive plate 10 of the embodiment, each extended weld portion 121c of the ring gear member 12 is welded to the outer peripheral portion 30b of the front cover 30. However, the manner in which the ring gear member 12 is fixed to the hydraulic transmission apparatus 3 is not limited to this. That is, as in a drive plate 10B of a modification example shown in FIG. 11, each extended weld portion 121c of the annular support member 121 may be fitted on the outer peripheral portion 30h of the front cover 30 of the hydraulic transmission apparatus 3, and may be extended to a joint between the front cover 30 and the pump shell 31a, and the free end of each extended weld portion 121e, the front cover 30, and the pump shell 31a may be welded together at the joint. This allows the front cover 30, the pump shell 31a, and the plurality of extended weld portions 121c of the ring gear member 12 to be simultaneously welded together, whereby the number of welding steps can be reduced. Moreover, this configuration allows a sufficient gap to be secured between the welded portion where the front cover 30, the pump shell 31a, and the plurality of extended weld portions 121c of the ring gear member 12 are welded together and the radially extending inner surface 30a of the front cover 30, and also allows a sufficient gap to be secured between this welded portion and the ring gear 120. This can further reduce the influence of the welding heat on the ring gear 120 and the portion including the radially extending inner surface 30a of the front cover 30 and the ring gear 120.

Figure 12:
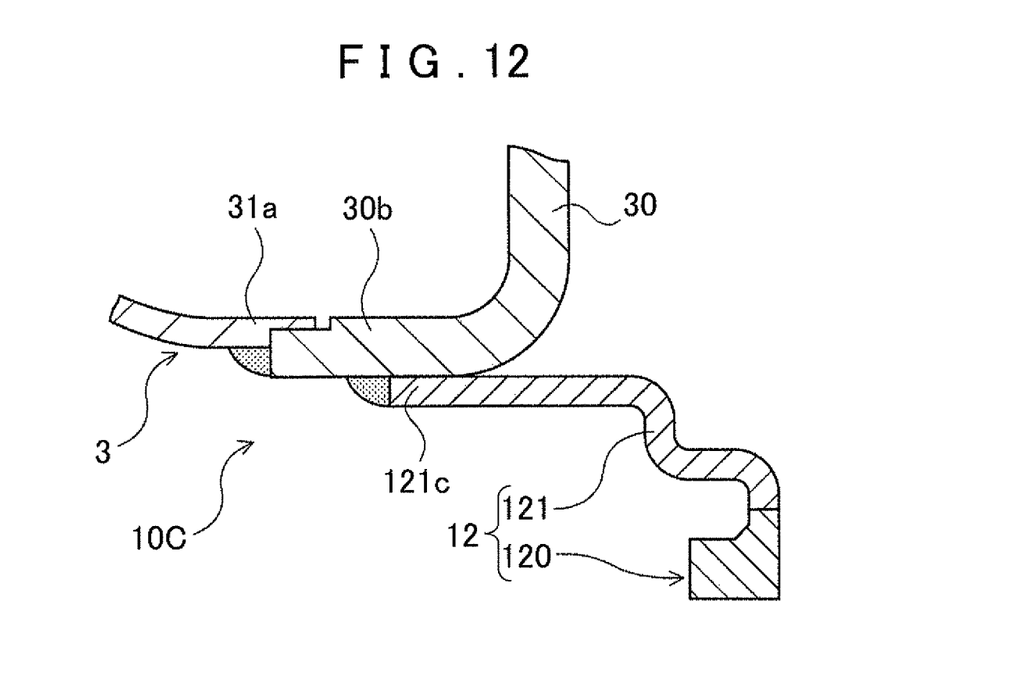
FIG. 12 is an enlarged cross-sectional view showing a main part of a drive plate 10C according to a modification example.
Figure 13:
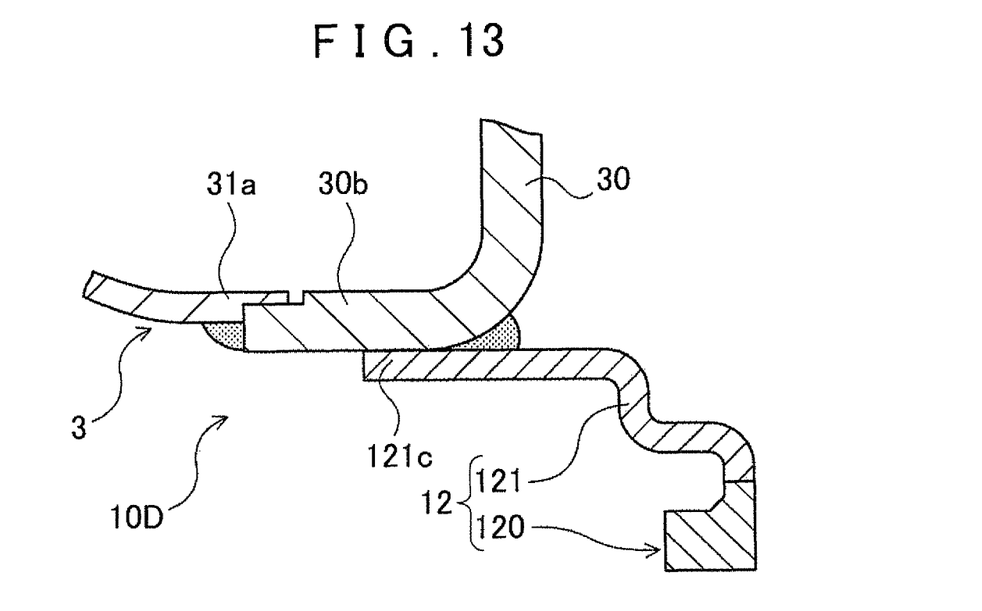
FIG. 13 is an enlarged cross-sectional view showing a main part of a drive plate 10D according to a modification example.
Figure 14:
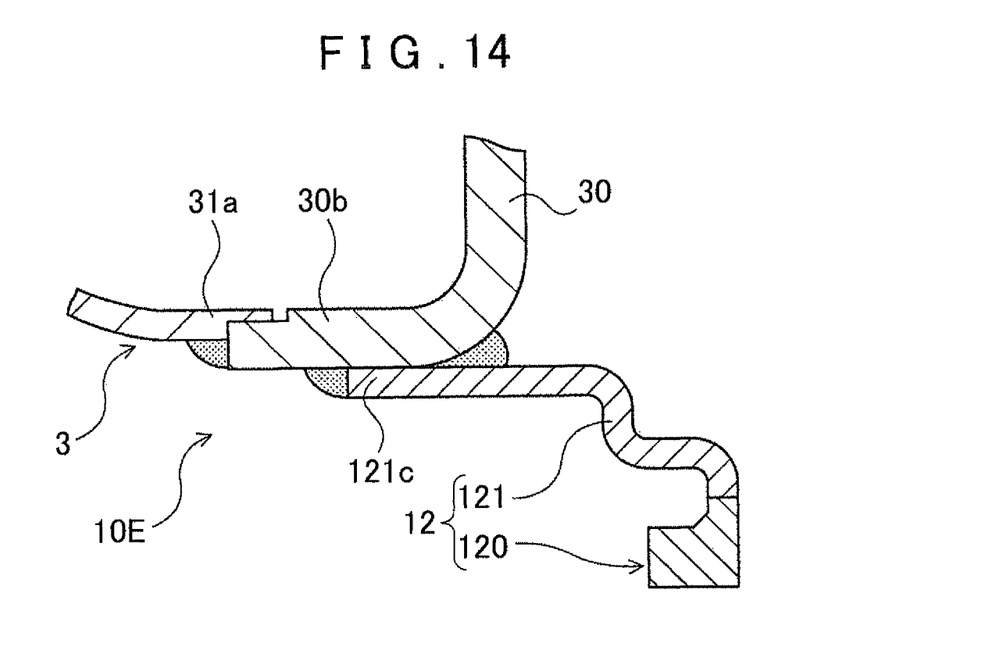
FIG. 14 is an enlarged cross-sectional view showing a main part of a drive plate 10E according to a modification example.

As in a drive plate 10C of a modification example shown in FIG. 12, each extended weld portion 121c of the annular support member 121 may be fitted on the outer peripheral portion 30b of the front cover 30 of the hydraulic transmission apparatus 3, and may be extended to a position before the joint between the front cover 30 and the pump shell 31a, and the free end of each extended weld portion 121c and the outer peripheral portion 30b of the front cover 30 may be welded together from the transmission apparatus side (the left side in the drawing) at a position on the engine side (the right side in the drawing) with respect to the joint between the front cover 30 and the pump shell 31a. Alternatively, as in a drive plate 10D of a modification example shown in FIG. 13, each extended weld portion 121e of the annular support member 121 may be fitted on the outer peripheral portion 30b of the front cover 30 of the hydraulic transmission apparatus 3, and may be extended to a position before the joint between the front cover 30 and the pump shell 31a, and an inner peripheral surface of the free end of each extended weld portion 121c and the outer peripheral portion 30b of the front cover 30 may be welded together from the engine side (the right side in the drawing). The configuration of FIG. 12 may be combined with the configuration of FIG. 13. Namely, as in a drive plate 10E of a modification example shown in FIG. 14, the free end of each extended weld portion 121c and the outer peripheral portion 30b of the front cover 30 may be welded together from the transmission apparatus side (the left side in the drawing) at a position on the engine side (the right side in the drawing) with respect to the joint between the front cover 30 and the pump shell 31a, and the inner peripheral surface of the free end of each extended weld portion 121c and the outer peripheral portion 30b of the front cover 30 may be welded together from the engine side (the right side in the drawing).

Instead of using the nuts 16 to fasten the plate member 11 to the ring gear 12, the periphery of each fastening hole 121b of the annular support member 121 through which the bolt 15 is inserted may be burred. Moreover, the element to which the power is to be transmitted and to which the drive plates 10, 10B are applied is not limited to the hydraulic transmission apparatus 3 that includes the front cover 30 and the single-plate lockup clutch 33 having the lockup piston 35 capable of frictionally engaging with the radially extending inner surface 30a of the front cover 30. That is, the element to which the power is to be transmitted and to which the drive plates 10, 10B to 10E are applied may be in any other form such as a friction clutch or an electromagnetic clutch as long as the power from the engine is transmitted thereto.

The correspondence between the main elements of the above embodiment and modification examples and the main elements of the invention described in "SUMMARY OF THE INVENTION" will be described below. In the above embodiment, etc., the drive plates 10, 10B to 10E that have the ring gear 120 capable of meshing with the pinion gear of the starter motor for cranking the engine, and that transmit the power from the engine to the hydraulic transmission apparatus 3 correspond to the "drive plate," the plate member 11 that is fixed to the crankshaft 2 of the engine corresponds to the "plate member," the ring gear member 12 that is formed as the annular member having the ring gear 120 in its outer periphery, and that includes the plurality of fastening portions 121a each fastened to the plate member 11 on the inner peripheral side with respect to the ring gear 120, and the plurality of extended weld portions 121c each extended from the inner peripheral side with respect to the ring gear 120 to the hydraulic transmission apparatus 3 side, and each having the free end that is welded to the outer peripheral portion 30b of the front cover 30 of the hydraulic transmission apparatus 3 corresponds to the "ring gear member," the annular support member 121 that has both the plurality of fastening portions 121a and the plurality of extended weld portions 121c on the inner peripheral side of the annular support member 121, and that has the ring gear 120 fixed to the outer periphery of the annular support member 121 corresponds to the "annular support member," and the hydraulic transmission apparatus 3 including the front cover 30 and the single-plate lockup clutch 33 having the lockup piston 35 capable of frictionally engaging with the radially extending inner surface 30a of the front cover 30 corresponds to the "hydraulic transmission apparatus."

It should be noted that the correspondence between the main elements of the embodiment and the main elements of the invention described in "SUMMARY OF THE INVENTION" is shown as an example to specifically describe the modes for carrying out the invention described in "SUMMARY OF THE INVENTION," and is not intended to limit the elements of the invention described in "SUMMARY OF THE INVENTION." That is, the embodiment is merely a specific example of the invention described in "SUMMARY OF THE INVENTION," and the invention described in "SUMMARY OF THE INVENTION" should be construed based on the description in "SUMMARY OF THE INVENTION."

Although the modes for carrying out the present invention are described above based on the embodiment, it is to be understood that the present invention is not limited to the above embodiment, and that various modifications can be made without departing from the subject matter of the present invention.

The present invention can be used in manufacturing industries of drive plates that transmit power from an engine to an element to which the power is to be transmitted, and ring gear members of the drive plates.

What is claimed is:

1. A drive plate that has a ring gear capable of meshing with a gear of a motor for cranking an engine, and that transmits power from the engine to an element to which the power is to be transmitted, comprising:
    a plate member that is fixed to a crankshaft of the engine; and
    a ring gear member that is formed as an annular member having the ring gear in its outer periphery, and that includes a plurality of fastening portions each fastened to the plate member on an inner peripheral side with respect to the ring gear, and a plurality of extended weld portions each extended from the inner peripheral side with respect to the ring gear to a side of the element to which the power is transmitted, and each having a free end that is welded to an outer periphery of a constituent member of the element to which the power is to be transmitted.

2. The drive plate according to claim 1, wherein
the ring gear member includes an annular support member that has both the plurality of fastening portions and the plurality of extended weld portions on an inner peripheral side, and that has the ring gear fixed to an outer periphery.

3. The drive plate according to claim 2, wherein
the element to which the power is to be transmitted is a hydraulic transmission apparatus that includes a front cover and a single-plate lockup clutch having a lockup piston capable of frictionally engaging with a radially extending inner surface of the front cover, and
the respective free ends of the plurality of extended weld portions are welded to an outer periphery of the front cover.

4. The drive plate according to claim 3, wherein
the hydraulic transmission apparatus includes a pump shell that is fixed to the front cover, and
the front cover, the pump shell, and the free ends of the plurality of extended weld portions are welded together at a joint between the front cover and the pump shell of the hydraulic transmission apparatus.

5. The drive plate according to claim 4, wherein
a nut, which is capable of self-piercing a bolt hole in the fastening portion, is fixed to each of the fastening portions of the ring gear member by clinching.

6. The drive plate according to claim 5, wherein
the ring gear member is formed by processing an annular body that is cut out from a plate material, and the plate member is formed by processing an inner remaining portion that is obtained by cutting out the annular body from the plate material.

7. The drive plate according to claim 1, wherein
the element to which the power is to be transmitted is a hydraulic transmission apparatus that includes a front cover and a single-plate lockup clutch having a lockup piston capable of frictionally engaging with a radially extending inner surface of the front cover, and the respective free ends of the plurality of extended weld portions are welded to an outer periphery of the front cover.

8. The drive plate according to claim 7, wherein the hydraulic transmission apparatus includes a pump shell that is fixed to the front cover, and the front cover, the pump shell, and the free ends of the plurality of extended weld portions are welded together at a joint between the front cover and the pump shell of the hydraulic transmission apparatus.

9. The drive plate according to claim 1, wherein a nut, which is capable of self-piercing a bolt hole in the fastening portion, is fixed to each of the fastening portions of the ring gear member by clinching.

10. The drive plate according to claim 1, wherein the ring gear member is formed by processing an annular body that is cut out from a plate material, and the plate member is formed by processing an inner remaining portion that is obtained by cutting out the annular body from the plate material.

11. A ring gear member for a drive plate, which has in its outer periphery a ring gear capable of meshing with a gear of a motor for cranking an engine, and forms, together with a plate member that is fixed to a crankshaft of the engine, a drive plate that transmits power from the engine to an element to which the power is to be transmitted, the ring gear member comprising:

a plurality of fastening portions each fastened to the plate member on an inner peripheral side with respect to the ring gear; and a plurality of extended weld portions each extended from the inner peripheral side with respect to the ring gear to a side of the element to which the power is transmitted, and each having a free end that is welded to an outer periphery of a constituent member of the element to which the power is to be transmitted.

* * * * *